United States Patent
Teraoka et al.

(10) Patent No.: US 10,413,985 B2
(45) Date of Patent: Sep. 17, 2019

(54) CONTROLLER AND A CONTROL METHOD FOR A HOT AIR BLOWER

(71) Applicant: Hakko Corporation, Osaka (JP)

(72) Inventors: Yoshitomo Teraoka, Osaka (JP); Hitoshi Takeuchi, Osaka (JP); Yasumasa Igi, Osaka (JP); Kenta Nakamura, Osaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 15/388,111

(22) Filed: Dec. 22, 2016

(65) Prior Publication Data
US 2018/0193937 A1 Jul. 12, 2018

(30) Foreign Application Priority Data

Dec. 25, 2015 (JP) .................... 2015-254262

(51) Int. Cl.
| | |
|---|---|
| G06F 19/00 | (2018.01) |
| B23K 3/047 | (2006.01) |
| B23K 11/25 | (2006.01) |
| G05B 19/10 | (2006.01) |
| G05B 19/042 | (2006.01) |
| B23K 1/018 | (2006.01) |

(52) U.S. Cl.
CPC ............ *B23K 3/0478* (2013.01); *B23K 1/018* (2013.01); *B23K 11/252* (2013.01); *G05B 19/042* (2013.01); *G05B 19/106* (2013.01)

(58) Field of Classification Search
CPC ..................................................... G05B 11/42
USPC ........................................................ 700/207
See application file for complete search history.

(56) References Cited

U.S. PATENT DOCUMENTS

| | | | | |
|---|---|---|---|---|
| 4,426,571 A * | 1/1984 | Beck | ........................ | H05K 3/34 156/497 |
| 5,381,945 A * | 1/1995 | Leicht | .................. | B23K 1/0016 228/180.21 |
| 6,131,791 A * | 10/2000 | Masaki | .................. | B23K 1/018 228/119 |
| 7,860,378 B2 * | 12/2010 | Teraoka | ............... | B23K 1/0016 392/379 |
| 2004/0026029 A1 * | 2/2004 | Martin | .................... | B29C 65/10 156/275.1 |
| 2015/0246404 A1 * | 9/2015 | Teraoka | .................. | B23K 3/08 219/129 |

* cited by examiner

*Primary Examiner* — Suresh Suryawanshi

(74) *Attorney, Agent, or Firm* — David B. Abel

(57) ABSTRACT

A controller and a control method for a hot air blower used in the field of solder reworking. The controller allows a user to change the control parameters effectively while using the hot air blower.

26 Claims, 8 Drawing Sheets

| stage | target temperture | target air volume | start time | end time |
|---|---|---|---|---|
| HP1 | TP1 | AV1 | 0 | TM1 |
| HP2 | TP2 | AV2 | TM1 | TM2 |
| HP3 | TP3 | AV3 | TM2 | TM3 |
| HP4 | TP4 | AV4 | TM3 | TM4 |
| HP5 | TP5 | AV5 | TM4 | TM5 |

CONTROLLER AND A CONTROL METHOD FOR A HOT AIR BLOWER

BACKGROUND OF THE INVENTION

Hot air is often used to melt solder when mounting/dismounting an electrical component. It is known that electrical components such as for example Surface Mount (SMT) packages may absorb moisture from the environment. The rapid increase in the temperature of the SMT package during a de-soldering operation may cause the absorbed moisture to superheat and turn to steam, delaminating the SMT Package and damaging the silicon chip inside the SMT package. Also, the rapid heating of an electrical component up to the melting temperature of the solder may damage the circuit board itself, or other nearby components. To address the potential problems, manufacturers of electrical components may provide suggested reworked procedures suggesting that the heating and hot air flow of the rework tool be staggered to first warm the component (and drive out moisture), then increase the heat delivered to the component over three or more stages until the reflow temperature of the solder is exceeded, at which point the component may be safely removed using a suction device.

In order to properly mount/dismount electrical components, the controller of a hot air rework tool may be preprogrammed with various temperature profiles, or rework control management data parameters, that may be preprogrammed into a memory of the controller. The rework control management data profiles may include temperature and airflow data points and elapsed time for each temperature set point. For example, a control management data profile may be divided into six (6) stages, and each stage has a set time and a target temperature. The control management data profiles may be preprogrammed so that they may be repeatedly used for identical or similar components. However, small changes in conditions, including for example the type or melt point of the solder, the characteristics of the substrate and the electrical component, and nearby components, may not suit the existing or preprogrammed control management data profiles, and could cause improper heating damaging the component or the substrate or nearby components.

Conventionally, even if the user noticed that the existing control management data will not work out, the user may only change the target temperatures or change the profile after all of the several stages of the heating process for the preprogrammed control management data profile have been completed, thus after the control management data profile finishes. If the user finds the control management data profile improper while the profile is executing, the user cannot change the setting. Since the user needs to wait until the selected profile finishes, it may take a long time to find an ideal target temperature profile.

SUMMARY OF THE INVENTION

The present invention provides a controller for a hot air rework tool that enables a user's ability to change the rework control management data profile contents effectively. The user can change the set temperature(s) of the profile while the controller of the rework tool is running a particular profile. The user can save the changes as a new profile.

DETAILED DESCRIPTION OF THE INVENTION

Figure 1:
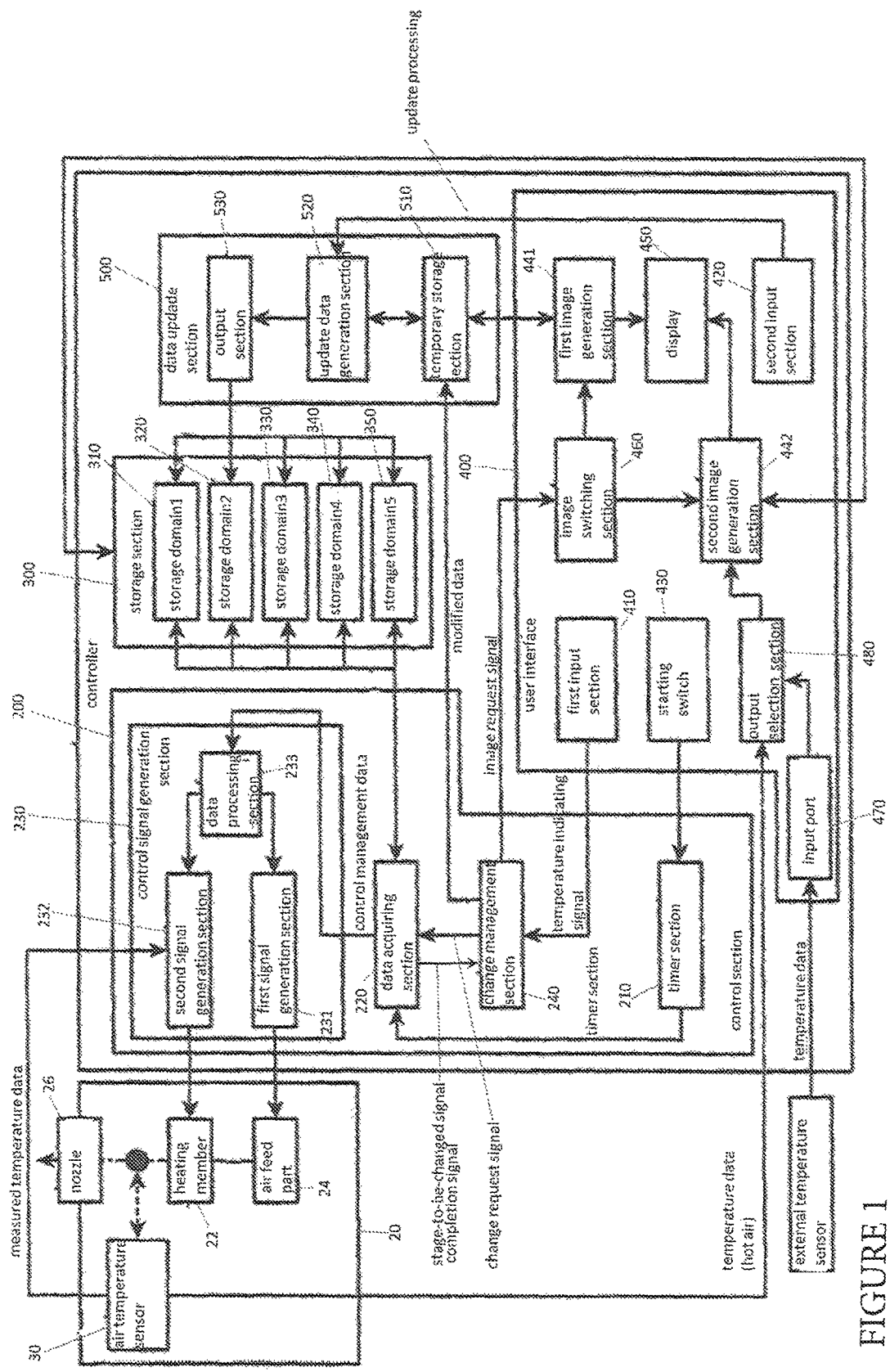
FIG. 1 is a block diagram of the circuitry of a controller and a hot air blower of the present invention.

FIG. 1 provides a block diagram of the circuitry of a controller 100 and an associated hot air blower 20. The controller 100 controls the airflow to and temperature of the hot air blower 20. The hot air blower 20 has a heating member 22 to heat air provided via an air feed 24 causing hot air to exhaust through a nozzle 26. The hot air blower 20 also preferably includes an air temperature sensor 30. The heating member 22 may be an inductive heater coil.

The controller 100 includes a heating control section 200, a data storage section 300 and a user interface 400. The data storage section 300 stores the control management data which define the heating control management data profiles. The data storage section may be a ROM (Read Only Memory) or a RAM (Random Access Memory), or other type of memory device, including a hard disk and/or a flash memory in a personal computer (PC) or a USB memory.

The heating control section 200 reads the set point data of the control management data profile from the storage section 300. The heating control section 200 generates a heating control output signal based upon the control management data profile set points and a timer. The heating control output signal is outputted from the heating control section 200 to the heating member 22 of the hot air blower 20, and the heating member 22 heats the air provided by the air feed 24 to blow hot air.

The user interface 400 includes a first input section 410, which may be a knob or dial or button on the controller 100, and a second input section 420 which receive input operations. The user can change the level of the thermal energy delivered to the heating member 22 of the hot air blower 20 by operating the first input section 410. For example, while a control management data profile is running and, in one stage, a temperature control of 180° C. is being executed, the user may change the target temperature from 180° C. to 190° C. by operating the first input section 410. Upon activation by the user, the first input section 410 generates a temperature indicating signal instructing that the target temperature be set to 190° C., or a 10° C. increase. The controller 100 also increases the level of the thermal energy delivered to the heating member 22 of the hot air blower 20 in order to meet the new target temperature.

The temperature indicating signal is outputted from the first input section 410 to a change management section 240 of the heating control section 200, and the heating control section 200 changes the target temperature according to the temperature indicating signal, while continuing to run the remaining control management data profile. In addition, the change management section 240 of the heating control section 200 outputs a change profile command to the temporary storage section 510 of the data update section 500 that may be used to define a new control management data profile, as discussed below. Therefore the user can operate the first input section 410 and change the control contents defined by the control management data profile if the profile in process is not proper and decide whether to save the changed profile command as a new profile at some point after the completion of the entire process.

The user interface 400 may include buttons, dials or a touch panel on the controller 100 for the first input section 410 and the second input section 420. Alternatively, the user interface 400 may be outside of the device, and may comprise one or more of a desk top or laptop computer, a keyboard, a mouse, a tablet computer or a smart phone using a wired or radio frequency/blue tooth connection to the controller 100.

A control management data profile includes data programmed with temperature, time duration, and air volume in at least two and usually four to six stages. Several control management data profiles may be preprogrammed into the controller 100 depending on the chip component and the board substrate that the user most often works with. Sometimes a recommended setting is provided by the electrical component manufacturer or the board manufacturer.

Figures 2, 3:
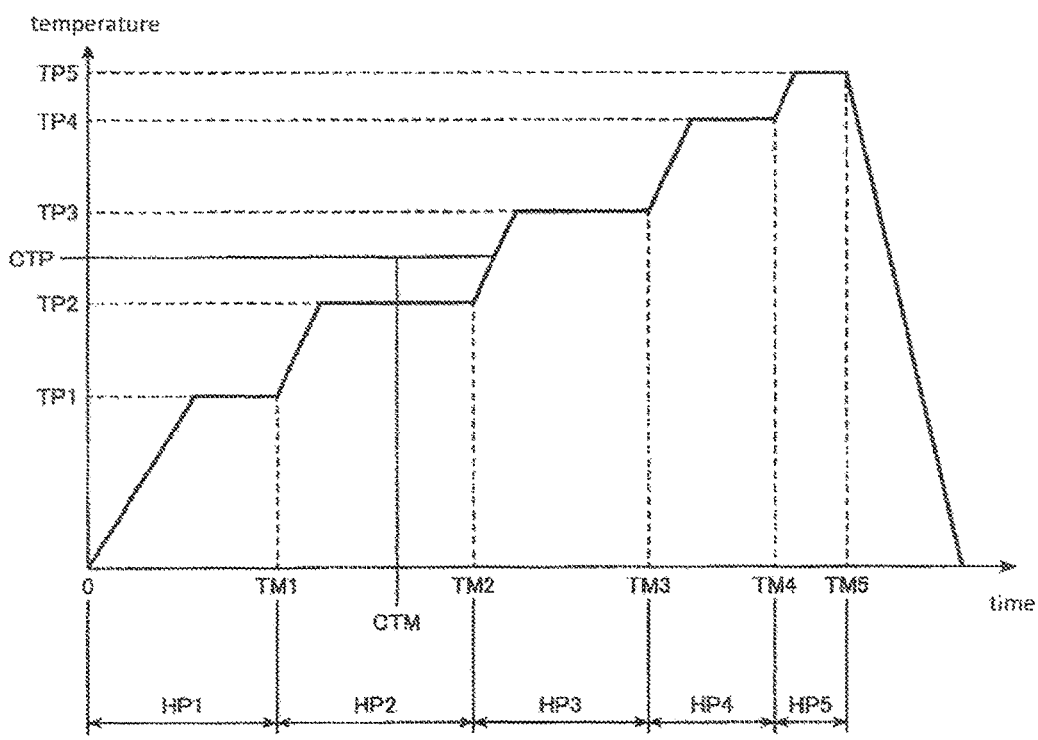
FIG. 2 is a chart showing an example of the control management data.
FIG. 3 is a graph depicting the temperature change profile according to the control management data of FIG. 2.

FIG. 2 is a chart depicting an example of a control management data profile and FIG. 3 shows the target temperature change profile being controlled according to the control management data profile of FIG. 2. As reflected in the chart of FIG. 2, the exemplary control management data profile has five stages, HP1-HP5, and for each stage the profile may include a target temperature (TP1-TP5), target air volume (AV1-AV5) a start time (0, TM1-YM4) and an end time (TM1-TM5). In the absence of a change input command from the user, the heating control section 200 of the controller 100 controls the heating provided by the hot air blower 20 from stage HP1 to stage HP5 in order and irreversibly. The target temperature of the control management data profile may be the temperature for the hot air, the component, the substrate, or the bonding material (such as solder). Target temperature TP5 is a higher temperature than the melting point (or reflow temperature) of the bonding material, while the target temperature TP4 is preferably close to but lower than the melting point.

FIG. 3 also illustrates that a user may change the target temperature for stage H2 from TP2 to "CTP" (change temperature) by operating the first input section 410 while the controller is running stage HP2 of the profile. Having the input "CTM" (change time), the heating control section 200 changes the target temperature to CTP before period HP2 finishes by increasing the power delivered to the heating member 22 of the hot air blower 20.

Figure 4:
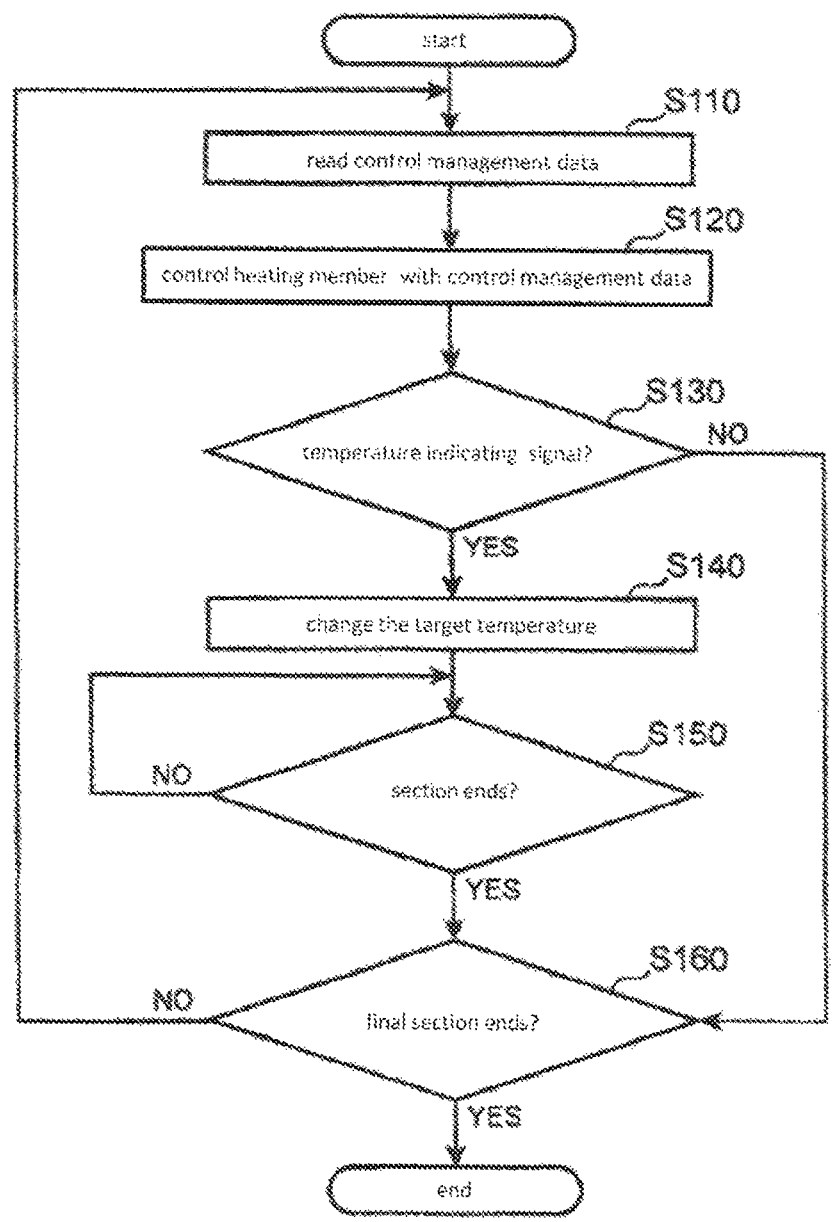
FIG. 4 is a flowchart of an exemplary operation of the heating control section of the controller which controls the heating member of the hot air blower.

FIG. 4 is a flowchart of an exemplary operation logic program of the heating control section 200 which controls the heating member 22 of the hot air blower 20. After the start, at step S110, the heating control section 200 reads out the control management data profile from the storage section 300 (FIG. 1), and in step S120, the heating control section 200 begins controlling the heating member 22 according to the control management data profile. In step S130, the heating control section 200 determines whether it has received a change temperature indicating signal from the first input section 410 or not. If a change temperature indicating signal is received, the program proceeds to step S140, and the heating control section 200 changes the target temperature according to the received change temperature indicating signal. As explained above, the heating control section 200 changes the control temperature in real-time, before the stage currently running ends. If the heating control section 200 did not receive temperature indicating signal at step S130, the program will skip to step S160. After changing the target temperature in step S140, the program proceeds to step S150 where the heating control section 200 determines whether the stage has ended or not, that is, for example, whether HP2 ends or not in FIG. 3. If at step S150, the stage has ended, the program proceeds to step S160. In step S160, the heating control section 200 determines whether the final stage of the profile has ended or not, that is, for example, whether HP5 ends or not in FIG. 3. A "NO" determination in step S160, means there are still stages to run, and the program returns to step S110. A "YES" determination at step S160 means the entire control management data profile has been completed.

The user of the system may conclude that the changed temperature value for the control management data profile would be preferable for similar combinations of substrates and chips. Accordingly, the controller of the present invention allows the user to enter the new profile into a system memory. The control logic for the controller 100 and how a new control management data profile including the modified target temperature is save and stored will be explained below with reference to the logic flow chart of FIG. 5 and the system block diagram of FIG. 1.

Making new control management data profiles contemplates interactions as between the heating control section 200, the storage section 300 and a data update section 500 of the controller 100 of FIG. 1. The storage section 300 may be used to store a new control management data profile in which the change of the specified target temperature for a given stage is reflected. The storage section 300 may replace the old control management data profile with a new changed profile. Alternatively, the storage section may keep the old control management data profile and store a new control management data profile separately.

Within the controller 100, when the temperature indicating signal is outputted from the first input section 410 to the heating control section 200, the heating control section 200 generates an updated data instruction including the new target temperature indicated by the temperature indicating signal. The updated data instruction is outputted to the data update section 500 from the heating control section 200. The data update section 500 makes a new control management data record based on the updated data instruction. The resulting new control management data profile is outputted from the data update section 500 to the storage section 300. The data update section 500 may be a CPU or an operation circuit, but the particular circuitry is not limited thereto. A new control management data profile may include temperature changes for one or more to all of the temperature settings of the entire heating processes, that is, each of the set points in the process from TM1 to TM5 in FIG. 3 may be changed by the user to create a new control management data profile. Alternatively, new control management data profile may be the temperature change of the heating processing stage where the temperature indicating signal is outputted from the first input section 410 to the heating control section 200, that is, for example, CTP of HP2 in FIG. 3, to create a new stage within stage HP2. Further, the new control management data profile may include changes to any of the target air volumes or the start time/end time durations.

Figure 5:
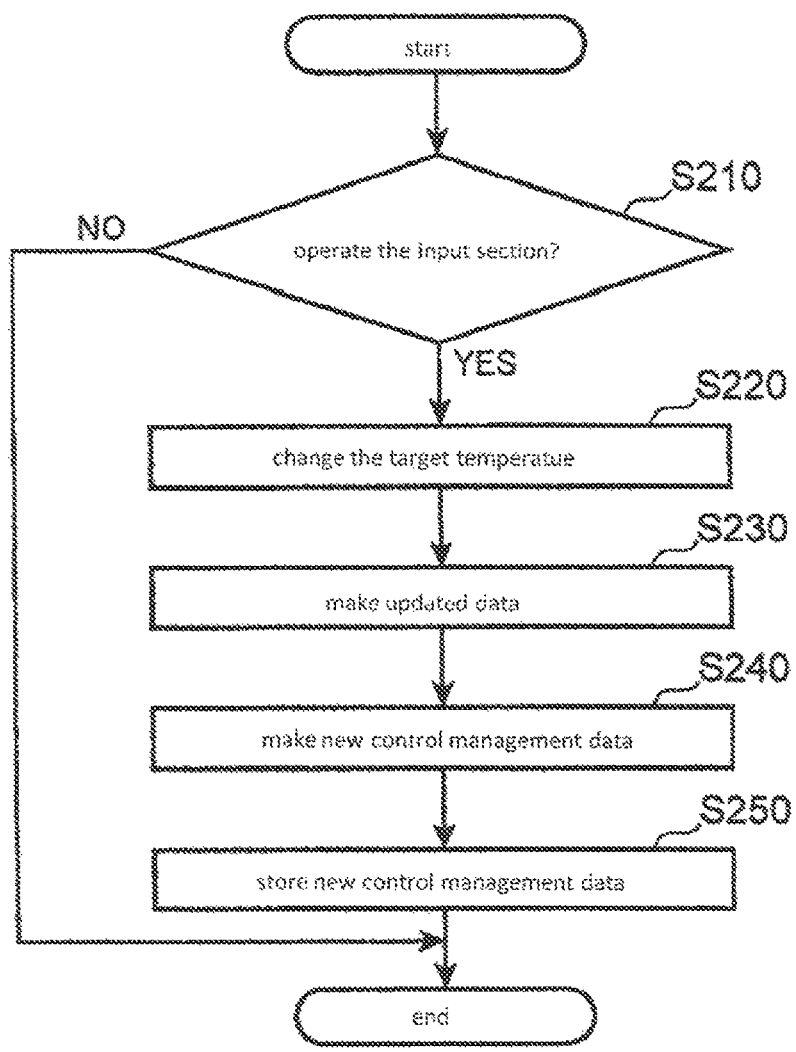
FIG. 5 is a flowchart of the process steps for generating a new control management data profile.

FIG. 5 is the flowchart of generating a new control management data profile. After the start of an operation, in step S210, if the user operates the first input section 410 to change a temperature setting, the first input section 410 creates the temperature indicating signal and updated data instruction output to the heating control section 200, then proceeds to step S220. Step S210 corresponds to step S130 in FIG. 4. In step S220, the heating control section 200 changes the target temperature according to the temperature indicating signal and updated data instruction. In step S230, the heating control section 200 generates updated data including information for the new target temperature. Updated data is outputted from the heating control section 200 to the data update section 500. In step S240, the data update section 500 makes a new control management data profile based on the updated data. In step S250, the new control management data profile is outputted from the data update section 500 to the storage section.

Sometimes a new target temperature set by the user may not be proper for a particular application. It may be preferable that the target temperature is only updated selectively under the user's permission. Referring to FIG. 1, the controller 100 updates the target temperature selectively under the user's permission. The controller 100 has a heating control section 200, storage section 300, user interface 400, and a data update section 500. The controller 100 is controlled by the operation of the user interface 400, and may generate a new control management data profile as described above. The storage section has storage domains 1 to 5. Each storage domain may store information of the time duration of the heat processing stage HP1-HP5, and its target temperature. For example, storage domain 1 includes time duration for heat processing stage HP1 and its target temperature TP1 of FIG. 2. Storage domains 2,3,4,5 also respectively store information of HP2-HP5 and TP2-TP5. Further, there may be a storage domain which stores "end-flag" information, storing information that it is the end of the heat process, in this case, after storage domain 5 and stage HP5. Storage domains 1-5 for the respective stages HP1 to HP5 may be different storage area in one memory device. Alternatively, storage domain 1 to 5 may be located in different memory devices. The number of the storage domains depends on the number of the heating processing periods and control management data profile.

As depicted in FIG. 1, the user interface 400 includes the first input section 410, the second input section 420, a starting switch 430, a first image generation section 441 and a display 450. As described above, the first input section 410 creates the temperature indicating signal demanding change of the target temperature. The second input section 420 is enabled by the user to decide whether to accept/deny the updated data of a new control management data profile. If the user permits update of the control management data profile by operating the second input section 420, the second input section 420 creates an update processing signal which updates the control management data profile stored in the memory of the storage section 300. If the user does not permit update of the control management data profile, the second input section 420 creates the update processing signal which cancels the update processing of the control management data profile. The second input section 420 may be a button or knob on the controller 100, or a keyboard of a personal computer, a mouse or other input devices. In the latter case, the user interface 400 may partially or totally in the form of a PC or tablet computer.

Alternatively, the second input section 420 may be a touch sensor of a touch panel, which may be integrated within the display 450. The starting switch 430 is operated to start the operation of the controller 100 and the hot air blower after selecting the control management data profile. The starting switch 430 creates the starting signal which is outputted from the starting switch 430 to the heating control section 200. The first image generation section 441 creates image data showing an image used to update the control management data. Also, the first image generation section 441 may generate image data output to the display 450 to show the graph or the chart of the target temperature defined by the control management data profile, and/or the measured temperature of the hot air, the component, or the substrate. The display 450 displays the information of the image data, for example on a light emitting diode (LED) display. The user can operate the second input section 420 while viewing the display 450. The display 450 may alternatively be a liquid crystal display or an organic electroluminescent display (OELD).

The heating control section 200 of the controller 100 includes a timer section 210, a data acquiring section 220, a control signal generation section 230 and a change management section 240. The timer section 210 starts the timer according to the starting signal from the starting switch 430, and generates timer data representing elapsed time from the time when the timer receives the starting signal (start time "0" in FIG. 2). The timer data is outputted from the timer section 210 to the data acquiring section 220. The timer section 210 may be a clock timer device or a CPU based timing circuit.

The data acquiring section 220 receives the timer data from the timer section 210. The data acquiring section 220 retrieves information concerning the heat processing stage from the storage section 300 according to the timer data. Once the data acquiring section 220 receives the timer data showing "0", the data acquiring section 220 reads the time length of the heating stage HP1, which is from time 0 to TM1, and the target temperature which is TP1 from the storage section 300 (referring to FIG. 1 and FIG. 2). This way the data acquiring section 220 may know that the heat processing stage HP1 extends until time TM1. The data acquiring section 220 creates the target temperature signal TP1 while the time of the timer is from time 0 to TM1. The target temperature signal is outputted from the data acquiring section 220 to the control signal generation section 230. The control signal generation section 230 generates a temperature indicating signal to control the temperature of the heating member 22 of the hot air blower 20.

When the target temperature signal is TP1, the control signal generation section 230 creates the heat control signal to execute the temperature feedback control based on TP1. The heat control signal is outputted from the control signal generation section 230 to the heating member 22. The same action happens for the control of stages HP2, HP3, HP4 and HP5, from data acquiring section 220 receiving the start time of TM1, TM2, TM3 and TM4, respectively. The data acquiring section 220 may receive the end-flag information together with the time length of heat processing period HP5, and therefore knows to end the series of heating processes.

If the user operates the first input section 410 to change a temperature profile, the temperature indication signal is outputted from the first input section 410 to the change management section 240. The change managements section 240 creates a change request signal requesting a change of the target temperature to the new temperature based on the temperature indicating signal from the first input section

410. The change request signal is outputted from the change management section 240 to the data acquiring section 220. The data acquiring section 220 generates the target temperature signal for the new target temperature. The new target temperature signal is outputted from the data acquiring section 220 to the control signal generation section 230 which creates the temperature control signal to run the temperature feedback based on the new target temperature. The temperature control signal for the new target temperature is outputted from the control signal generation section 230 to the heating member.

The data acquiring section 220 receiving the change request signal refers to the timer data and determines which heat processing stage it belongs to. The data acquiring section 220 creates the stage-to-be-changed signal which represents the heat processing stage of the received time of the change request signal and the new target temperature set according to the temperature indicating signal. The stage-to-be-changed signal is outputted from the data acquiring section 220 to the change management section 240. The change management section 240 makes the modified data representing the heat processing stage where the received time of the change request signal belongs, and the new target temperature set according to the temperature indicating signal, by referring to the stage-to-be-changed signal. The modified data is outputted from the change management section 240 to the temporary storage section 510 of the data update section 500. The change management section 240 may also output an image request signal to the image switching section 460 of the user interface 400 discussed in more detail below.

When the data acquiring section 220 receives the timer data of TM5, it creates a completion signal. Like the stage-to-be changed signal, the completion signal is also output from the data acquiring section 220 to the change management section 240. The change management section 240, upon receiving the completion signal, creates an image request signal to the image switching section 460 of the user interface 400 which requests the generation of an image data showing the confirmation image where the user selects whether or not to update the target temperature. The image request signal is outputted from the change management section 240 through the image switching section 460 to the first image generation section 441. The first image generation section 441 creates the confirmation image according to the image request signal. The image data is outputted from the first image generation section 441 to the display 450. The first image generation section 441 may be a CPU or other image generation circuitry.

The data update section 500 of the controller 100 includes a temporary storage section 510, an update data generation section 520 and an output section 530. The modified data is outputted from the change management section 240 to the temporary storage section 510 of data update section 500. The temporary storage section 510 can store the information of the heat processing stage of the received time of the change request signal and the target temperature set by the temperature indicating signal. The first image generation section 441 receiving the image request from the change management section 240, accesses the temporary storage section 510 and acquires information about the heat processing stage and the new target temperature. The first image generation section 441 creates the image data of the heat processing stage and the new target temperature. The image data is outputted from the first image generation section 441 to the display 450. The display 450 shows the confirmation image according to the image data, and may prompt the user asking whether to update the target temperature. The user operates the second input section 420 looking at the displayed image. If "update" is selected by operating the second input section 420, the second input section 420 creates an update processing signal requesting the update of the target temperature. If "cancel" is selected by operating the second input section 420, the second input section 420 creates an update processing signal to cancel update of the target temperature.

The update processing signal is outputted from the second input section 420 to the update data generation section 520. When the update processing signal to cancel update of the target temperature is outputted from the second input section 420 to the update data generation section 520, the update data generation section 520 deletes the information about the corresponding heat processing stage from the temporary storage section 510. When the update processing signal requesting update of the target temperature is outputted from the second input section 420 to the update data generation section 520, the update data generation section 520 reads the information from the temporary storage section 510 about the heat processing stage which the update permission belongs to. The update data generation section 520 determines where to output the update data of the new target temperature according to the information of the heat processing stage read from the temporary storage section 510. The update data generation section 520 makes the update data using information about the new target temperature and the output destination. The update data is outputted from the update data generation section 520 to the output section 530. When changes have been made to multiple heat processing stages, the update process is respectively performed for each multiple heat processing stage selectively. The output section 530 outputs information for new target temperature(s) to the output destination indicated by the update data. If the user operates the second input section 420 and permits update of the target temperature in stage HP1, the output section 530 outputs information of new target temperature to storage domain 1. If the user permits update of the target temperature in HP2, HP3, HP4 and HP5, the output section 530 outputs information to storage section 2, 3, 4 and 5 respectively.

Figure 6:
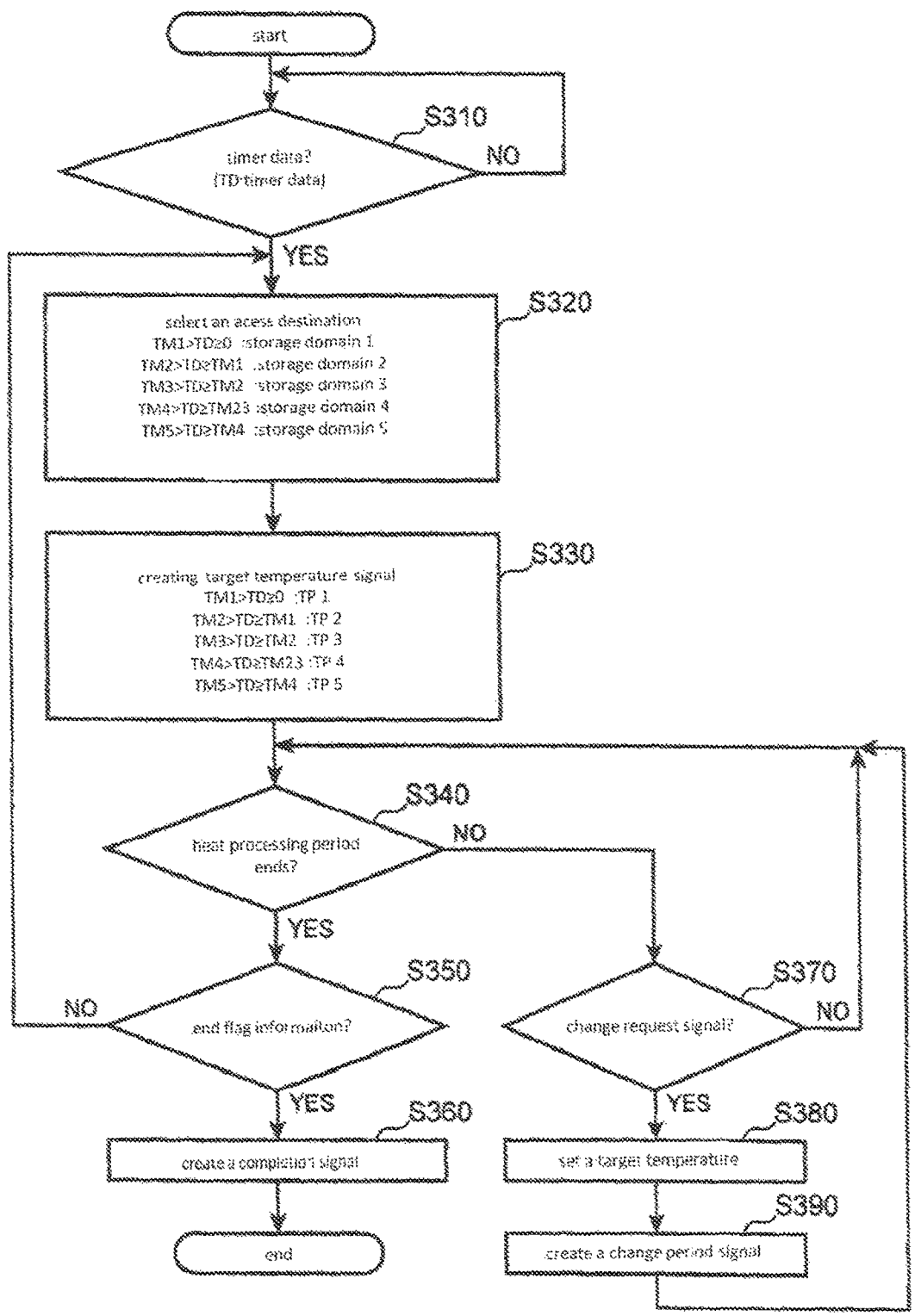
FIG. 6 is a flowchart of the operation of the data acquiring section of the controller.

FIG. 6 is a flowchart of the functional logic of the data acquiring section 220. When the controller 100 is powered on, Step S310 repeats until the user operates the starting switch 430. When the user operates the starting switch 430, the starting signal is outputted from the starting switch 430 to the timer section 210. The timer section 210 starts measuring time according to the starting signal, and generates timer data. When the data acquiring section 220 receives the timer data from timer section 210, the logic proceeds from step S310 to step S320. In step S320, the data acquiring section 220 refers to the timer data, and selects one of the storage domains 1, 2, 3, 4 or 5 as an access destination. If the timer data is 0 or more but less than TM1, the data acquiring section 220 selects the storage domain 1. Selecting another subsequent storage domain is performed in a similar manner. Upon completion, the logic proceeds to step S330. In step S330, the data acquiring section 220 acquires the control management data from the access domain selected in step S320. The data acquiring section 220 creates the target temperature signal based on the control management data profile. The target temperature signal is outputted from the data acquiring section 220 to the control signal generation section 230. The control signal generation section 230 creates the heat control signal to control the heating member based on the target temperature. The heating member is heated based on the heating control signal. After generation of the target temperature signal, in step S340, the data acquiring section 220 refers to the timer data and judges if the heat processing stage defined by the control management data has ended or not. When the data acquiring section 220 judges that the heat processing stages have ended ("Yes"), it proceeds to step S350. Otherwise, from S340 it proceeds to step S370, discussed below. The control management data of the final heat processing stage is accompanied by end-flag information. In this embodiment, the end-flag information is read out together with the control management data in domain 5, from step S330 to step S350 In step S350, when the data acquiring section 220 reads the end flag information ("Yes"), the logic proceeds to step S360. Otherwise, it returns to step S320. In step S360, the data acquiring section 220 creates a completion signal. The completion signal is outputted from the data acquiring section 220 to the change management section 240, and the processing of the data acquiring section 220 ends.

At step 340, when the data acquiring section 220 judges that the heat processing stages have not ended ("No") the logic proceeds to step S370. Step S370 is proceeded to when in step S340, the data acquiring section 220 upon referring to timer data determines that it is within a heat processing stage. In step S370, if the change request signal is outputted from the change management section 240 to the data acquiring section 220, it proceeds to step S380. Otherwise, it proceeds back to step S340. In step S380, the data acquiring section 220 sets the target temperature indicated by the change request signal and crates the target temperature signal. The target temperature signal is outputted from the data acquiring section 220 to the control signal generation section 230. After outputting the target temperature signal of the new target temperature, the logic proceeds to step S390. In step S390, the data acquiring section 220 generates the stage-to-be-changed signal, which relates to the new target temperature and the corresponding heat processing stage processed in step S340. The stage-to-be-changed signal is outputted from the data acquiring section 220 to the change management section 240, and the logic proceeds back to step S340.

Figure 7:
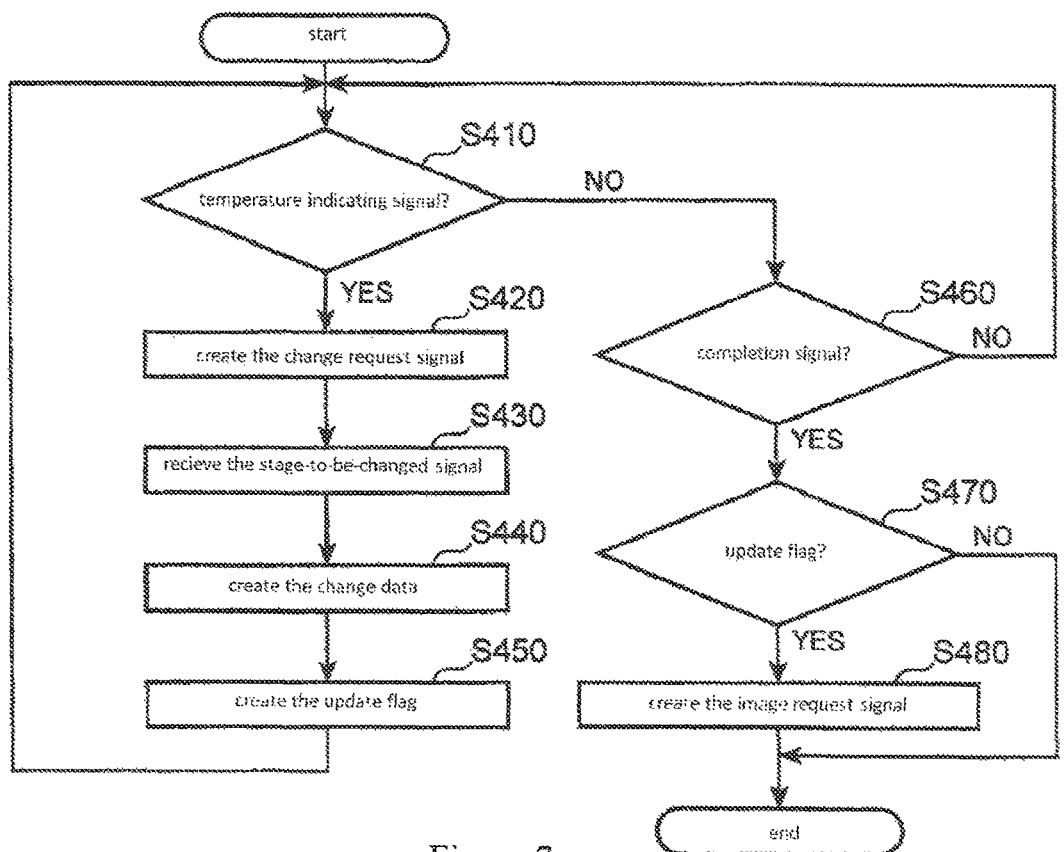
FIG. 7 is a flowchart of the operation of the change management section of the controller.

FIG. 7 is a flowchart of the logic of the change management section 240. After a start and in step S410, the change management section 240 judges if it receives the temperature indicating signal from the first input section 410 or not. When the temperature indicating signal is outputted from the first input section 410 to the change management section 240, the logic proceeds to step S420. Otherwise, the logic proceeds to step S460. In step S420 the change management section 240 creates the change request signal representing the target temperature determined by the temperature indicating signal. The change request signal is outputted from the change management section 240 to the data acquiring section 220. Step S380 and S390 explained with reference to FIG. 6 will be executed in step S420. After step S390 in FIG. 6, Step S430 is executed. In step S430, the change management section 240 receives the stage-to-be-changed signal from the data acquiring section 220. As described with respect to FIG. 6, the stage-to-be-changed signal includes information about new target temperature and its corresponding heat processing stage. In step S440, the change management section 240 creates modified data about new target temperature and the heat processing stage. The modified data is outputted from the change management section 240 to the temporary storage section 510. In step S450, the change management section 240 creates an update flag representing there was a change of the target temperature, and it proceeds back to step S410. In step S460, after step 410 when there is no temperature indicating signal, the change management section 240 judges if it receives the completion signal (refer to step S360 of FIG. 6) from the data acquiring section 220 or not. The logic proceeds from S460 to step S470 when yes. Otherwise, the logics returns from S460 back to step S410. In step S470, the change management section 240 judges if there has been a receipt of an update flag or not. If there is, then it proceeds to step S480. Otherwise, the change management section 240 ends the processing. In step S480, having obtained an update flag, the change management section 240 creates the image request signal requesting the checking image. The image request signal is outputted from the change management section 240 through the image switching section 460 to the first image generating section 441. The image generation section reads out the modified data from the temporary storage section 510 according to the image request signal. The image generation section creates the image data of the checking image. The image data is outputted from the image generation section to the display 450.

Figure 8:
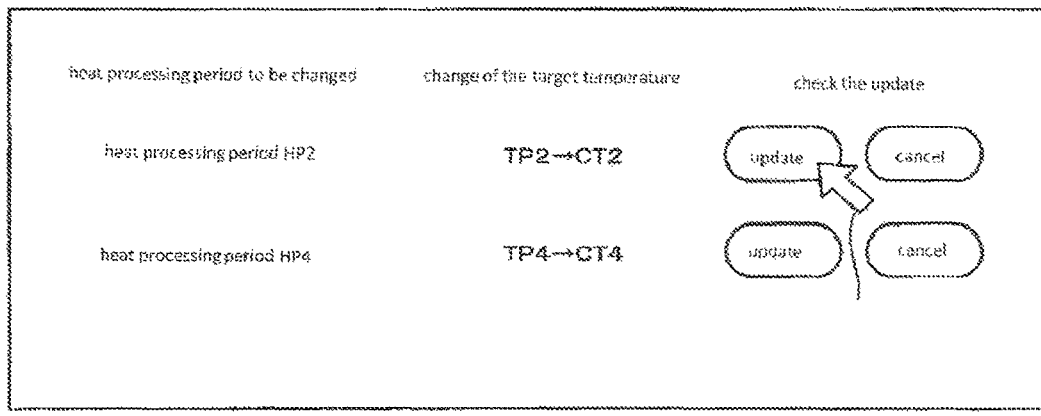
FIG. 8 is the image shown by a display of the controller after the step S480 of the flowchart of FIG. 7.

FIG. 8 is representative of the checking image display shown on the screen of the display 450 after step S480. The checking image shown in the embodiment FIG. 8 indicates that the user has changed the target temperature while HP2 and HP4 were executing. The checking image shows the change of the target temperature from TP2 to CT2 in heat processing stage HP2. This means that the user operates the first input section 410 and requests the change of the target temperature from TP2 to CT2 while executing HP2. The same thing applies to TP4 changed to CT4, in heat processing stage HP4, which is executed later than HP2. The checking image shows update buttons and cancel buttons. A mouse device may be used as part of the function of the second input section 420 (FIG. 1), and if the user clicks the update button, the second input section 420 creates the update processing signal to allow update of the target temperature. If the user clicks the cancel button, the second input section 420 creates the update processing signal to cancel the update of the target temperature. This could be done respectively to each heat processing stage displayed on the display 450 for allowance/cancellation.

Figure 9:
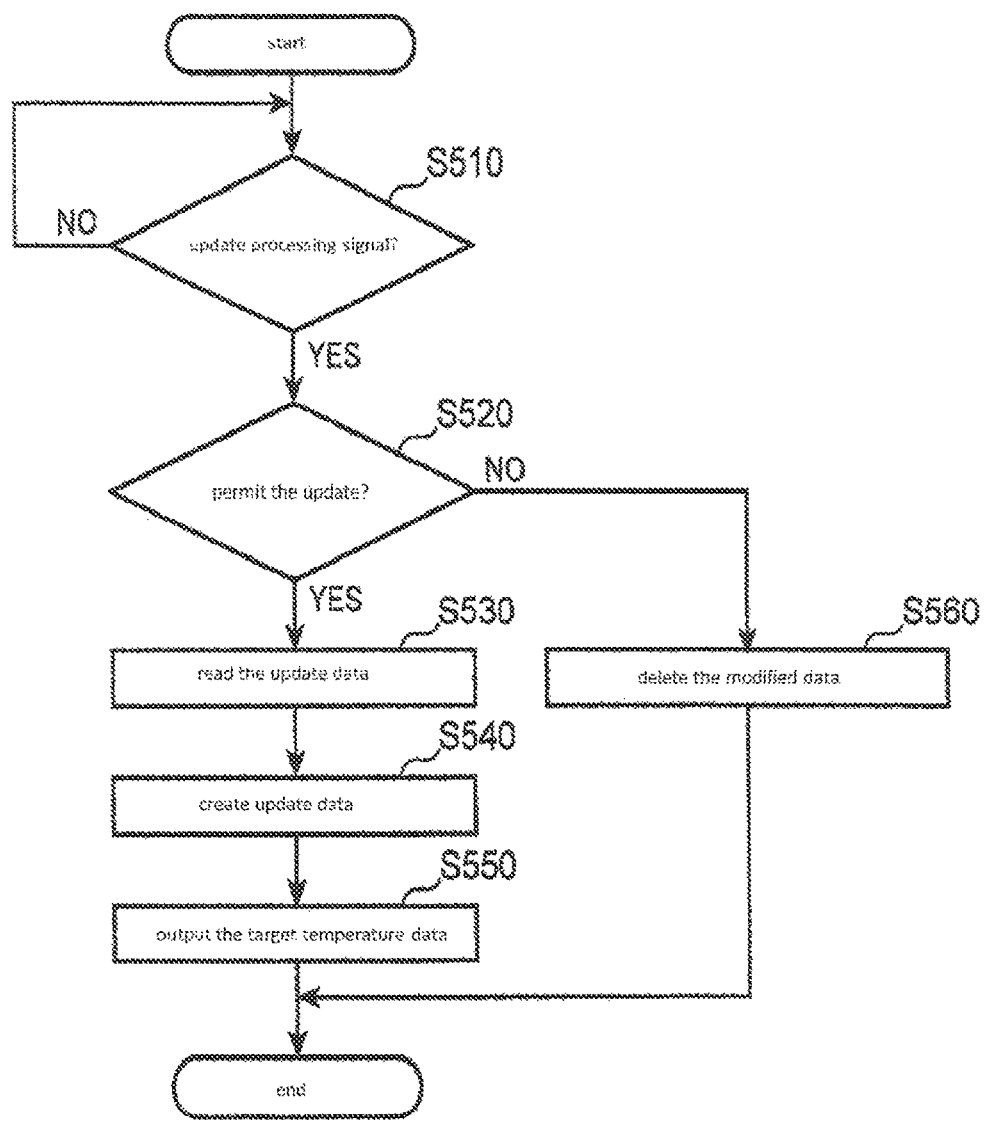
FIG. 9 is a flowchart of the operation of the data update section of the controller.

FIG. 9 is a flowchart of the logic of the data update section 500 of FIG. 1. In step S510, after a start, the update data section waits to receive an update processing signal. When it does, it proceeds to step S520. In step S520, when the update processing signal permits the update of the target temperature, it proceeds to step S530. Otherwise, it proceeds to step S560. In step S530, the update data generation section 520 reads the modified data from the temporary storage section 510 and then proceeds to step S540. In step S540, the update data generation section 520 creates the update data including information about the output destination (domain) and the new target temperature. The information about the output destination (domain) is based on the update processing signal. The information about the new target temperature is based on the modified data. The update data is outputted from the update data generation section 520 to the output section 530. In step S550, the output section 530 outputs the target temperature data to the defined destination (storage domain). This may be an overwrite processing step. Step S560 is processed when an update processing signal cancels (based on user input) the update, and the update data generation section 520 deletes the modified data from the temporary storage section 510.

Throughout the disclosed embodiment, the controller 100 may use not only images displayed on the display 450, the display could be replaced or used together with a sound generating system or other user notification technologies to ask the user if updating target temperature to be stored is requested or if the updated information is to be deleted.

The display 450 may show the target temperature and the actual measured temperature of the hot air. This will allow the user to visually check the difference between the target temperature and the measured temperature and change the target temperature if necessary.

The hot air blower 20 is provided with the heating member 22, an air feed part 24 and a nozzle 26 as described above. The air feed part 24 may be a sirocco fan, a turbo fan, a cross flow fan, a propeller fan or any other general common fan device. The heating member 22 is located between the air feed part 24 and the nozzle 26, and hot air is blown out from the nozzle 26. As shown in FIG. 2, the target air volume is set in the control management data, to each heat processing stage HP1, HP2, HP3, HP4 and HP5, stored in domain 1, 2, 3, 4, and 5 respectively. The controller 100 controls the air supply section provided by the air feed part 24 according to the data of the target air volume.

The control section 200 includes the data acquiring section 220 and the control signal generation section 230. The data acquiring section 220 receives the timer data from the timer section 210 and the change request signal from the change management section 240. The data acquiring section 220 outputs the stage-to-be-changed signal and the completion signal to the change management section 240. The data acquiring section 220 reads the control management data from the storage domain 1, 2, 3, 4 and 5 sequentially according to the timer data. Then the data acquiring section 220 outputs the control management data to the control signal generation section 230. The control signal generation section 230 includes a first signal generation section 231, a second signal generation section 232 and a data processing section 233. The data processing section 233 receives the control management data from the data acquiring section 220. The data acquiring section 220 gives the instruction about target air volume to the first signal generation section 231. The first signal generation section 231 creates the control signal so that amount of air indicated in the target air volume is blown from the air feed part 24. The data acquiring section 220 gives the instruction about the target temperature to the second signal generation section 232. In addition, the air temperature sensor 30 of the hot air blower 20 provides measured temperature data to the second signal generation section 232. The second signal generation section 232 uses the instruction about the target temperature from the data acquiring section 220 and the measured temperature data the air temperature sensor 30 to provide an output signal to control the heating member 22 based on the target temperature of the control management data and the feedback of the measured temperature.

The air temperature sensor 30 measures the temperature of the hot air between the heating member 22 and the nozzle 26. The air temperature sensor 30 creates the measured temperature data. The measured temperature data is outputted from the air temperature sensor 30 to the second signal generation section 232 and the user interface 400. The second signal generation section 232 creates the control signal to adjust a difference between the target temperature and the measured temperature. The control signal is outputted from the second signal generation section 232 to the heating member. Therefore, the heating member is feedback controlled by the second signal generation section 232 and the air temperature sensor 30.

When the change request signal is outputted from the change management section 240 to the data acquiring section 220, the data acquiring section 220 changes the target temperature read from the temperature read from the storage section 300 to the temperature indicated by the change request signal. The control management data including the date of new target temperature is outputted from the data acquiring section 220 to the data processing section 233. The data processing section 233 outputs the data of new target temperature to the second signal generation section 232. Working with the air temperature sensor 30, the second signal generation section 232 controls the heating member based on the new target temperature. Therefore, the user can change the target temperature of the heating member before finishing the whole process of the control management data.

The user interface 400 includes the first input section 410, the second input section 420, the starting switch 430, the display 450, the first image generation section 441, the second image generation section 442, an image switching section 460. The image switching section 460 gives the generation instruction of an image data for either the first image generation section 441 or the second image generation section 442. The output destination of the generation instruction is switched from the second image generation section 442 to the first image generation section 441 based on the image request signal outputted from the change management section 240 to the image switching section 460. The image switching section 460 gives a generation instruction to the second image generation section 442 before step S480 in the flowchart of FIG. 7. When the generation instruction is outputted from the image switching section 460 to the second image generation section 442, the second image generation section 442 generates the image data. After step S480 in FIG. 7, the image switching section 460 gives the generation instruction to the first image generation section 441. When the generation instruction is outputted from the image switching section 460 to the first image generation section 441, the first image generation section 441 generates the image data. The first image generation section 441 reads the modified data from the temporary storage section 510 and makes the image data of the checking image as explained with respect to FIG. 8. Once the generation instruction is outputted from the image switching section 460 to the second image generation section 442, the second image generation section 442 reads the whole control management data profile from the storage section 300. Therefore, the second image generation section 442 may create the image data of the target temperature and time indicated by the control management data profile.

The measured temperature data is outputted from the air temperature sensor 30 to the second image generation section 442. The timer data is outputted from the timer section 210 to the second image generation section 442. Therefore, the second image generation section 442 can create the image data of the current heat processing stage and the measured temperature.

Figure 10:
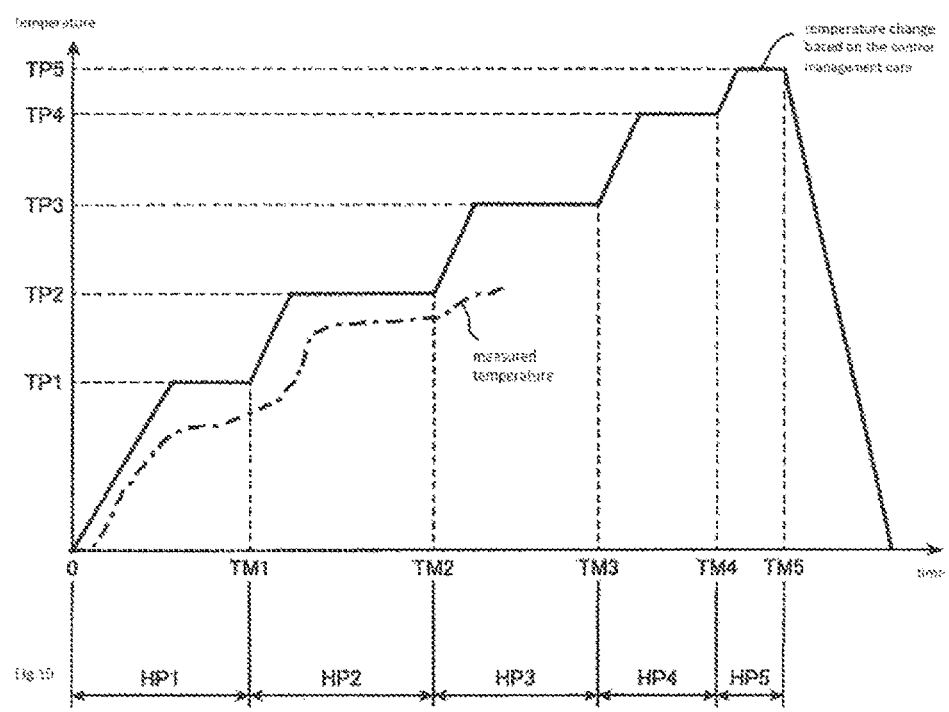
FIG. 10 is an exemplified image displayed on the display of the controller based on the image data created by the second image generation section of the controller.

FIG. 10 shows an exemplified image displayed on the display 450 based on the image data created by the second image generation section 442. The display 450 shows a data line indicating temperature transition based on the control management data in the storage section 300 (solid line) and a data line indicating temperature actually measured by the temperature sensor (dashed line). The display 450 shows the measured temperature in real time. The user can compare the two temperatures represented in the data line (as the solid line and dashed line) on the display 450. The user may judge to change the target temperature or not by referring to the difference between the measured temperature and the stored temperature. As depicted in FIG. 10, when the measured temperature is lower than the data line of the stored temperature, the user can raise the target temperature by operating the first input section 410. This may be effective when the target temperature is showing the temperature of the substrate or the component. The aforesaid technology of changing the target temperature may also apply for the change of the target air volume.

The display 450 may show the measured temperature of a substrate, a chip component or a bonding material (such as solder), and its target temperature for these elements. The user can visually see the difference between the target temperature and the measured temperature for the temperature of these materials or elements, and operate the controls to change the target temperature.

As described in FIG. 1, the user interface 400 includes an input port 470 and an output selection section 480. The input port 470 is electrically connected with an external temperature sensor. The external temperature sensor is to be attached to the area where the hot air blows out, that is, the substrate, the chip component or the bonding material. The external temperature sensor creates the temperature data, and it is outputted from the external temperature sensor to the output selection section 480 through the input port 470.

Besides the external temperature sensor, the air temperature sensor 30 keeps measuring the temperature of the hot air, generating a detected hot air temperature data, which is outputted to the output selection section 480. The output selection section 480 may be used to select the type of data outputted to the second image generation section 442. Generally known devices such as a keyboard or mouse may be used as the output selection section 480. The output selection section 480 may output the temperature data of the air temperature sensor 30 to the second image generation section 442.

Alternatively, the output selection section 480 may output the temperature data of the external temperature sensor to the second image generation section 442. Furthermore, the output selection section 480 may output the temperature data of both the air temperature sensor 30 and the external temperature sensor. The second image generation section 442 creates the image data outputted by the output selection section 480. The image data is outputted from the second image generation section 442 to the display 450. If the temperature data from the air temperature sensor 30 is outputted from the output selection section 480 as an output data, the display 450 shows the measured temperature of the hot air blower air flow and the target temperature. If the temperature data from the external temperature sensor is outputted from the output selection section 480 as an output data, the display 450 shows the measured temperature of the substrate and the chip and the target temperature.

Those skilled in the art will appreciate that the foregoing disclosure is meant to be exemplary and actual parameters and the flowchart logic figures are provided to explain the present invention, without intending to limit the potential modes of carrying out the present invention. The scope of the invention is defined only by the appended claims and equivalents thereto.

The invention claimed is:

1. A controller for controlling the level of the thermal energy temperature and airflow of a hot air blower having a heating member and an air feed, said controller comprising:
   a heating control section to execute control management data instructions which define heating control management data profiles having multiple stages, said heating control section executes the profile from a first stage to a last stage in order and irreversibly;
   a data storage section to store control management data profiles; and
   a user interface including an input section to receive user input and said user interface provides operation instructions to change the level of the thermal energy delivered to the heating member of the hot air blower during the controller's execution of any stage of a heating control management data profile, including changes to the target temperature during a specific stage of the profile during execution of that stage.

2. The controller of claim 1, wherein said controller controlling the heating provided by the hot air blower according to a heating control management data profiles having multiple stages, and the controller changes the target temperature and the level of the thermal energy delivered to the heating member upon receipt of an input to said input section and thereafter continuing to run the remaining control management data profile stage or stages.

3. The controller of claim 2, wherein said input section of said user interface further allows user input to provide an operation instruction to save changes in the level of the thermal energy delivered to generate a new control management data profile.

4. The controller of claim 3, wherein after the execution of the last stage of the control management data profile, a data update section of said controller outputs a new control management data profile to said data storage section upon receipt of a user input to said input section to update the control management data profile.

5. The controller of claim 4, wherein the update of the control management data profile is selectable for each stage where the level of the thermal energy is changed.

6. The controller of claim 1, wherein said input section of said user interface comprises a first input section and a second input section, said first input section receiving user input to change the level of the thermal energy delivered to the heating member and the second input section receiving user input to provide operation instructions to generate a new control management data profile.

7. The controller of claim 1, wherein said heating control section reads set point data of the control management data profile from the storage section and generates a heating control output signal based upon the control management data profile set points and a timer.

8. The controller of claim 6, wherein said first input section of said user interface generates a temperature indicating signal upon activation by a user, said temperature indicating signal instructing that the target temperature be changed, said temperature indicating signal being outputted from said first input section to a change management section of said heating control section, whereupon said heating control section changes the target temperature according to the temperature indicating signal while continuing to run the remaining control management data profile.

9. The controller of claim 1, wherein said data storage section may be a ROM (Read Only Memory) or a RAM (Random Access Memory), a hard disk and/or a flash memory in a personal computer (PC) or a USB memory.

10. The controller of claim 6, wherein said user interface includes buttons, dials or a touch panel on the controller for the user to activate said first input section and said second input section of said controller.

11. The controller of claim 1, wherein said user interface is provided by a desk top computer, a laptop computer, a keyboard, a mouse, a tablet computer or a smart phone using a wired or radio frequency or blue tooth connection to said controller.

12. The controller of claim 1, wherein said data storage section stores at least one control management data profile including data programmed with temperature, time duration, and air volume in at least two stages for controlling said temperature and airflow of a hot air blower, said data profile being executed by said controller sequentially subject to a change data signal input from said user interface.

13. The controller of claim 1, wherein said data storage section stores at least one control management data profile including data programmed with temperature, time duration, and air volume in four to six stages for controlling said temperature and airflow of the hot air blower, said data profile being executed by said controller sequentially subject to a change data signal input from said user interface.

14. The controller of claim 1, wherein said data storage section stores a plurality of control management data profiles, each profile having five stages, and for each stage the profile includes a target temperature, target air volume, a start time and an end time, said controller controlling the heating provided by the hot air blower from the first stage to the last stage in order and irreversibly unless modified by a change input command.

15. The controller of claim 14, wherein said target temperature of the control management data profiles is either one of the temperature for the hot air, the component, the substrate, or the bonding material as measured by a temperature sensor providing a temperature signal input to said controller.

16. The controller of claim 8, wherein said change management section of said heating control section outputs a change profile command to said data storage section to define a new control management data profile.

17. The controller of claim 16, wherein said user interface allows a user to input an instruction to said change management section to control the output of the change profile command to said data storage section.

18. The controller of claim 1, wherein said data storage section stores a plurality of control management data profiles, each profile having five stages, and for each stage the profile includes a target temperature, target air volume, a start time and an end time, said controller controlling the heating provided by the hot air blower from the first stage to the last stage in order and irreversibly and wherein said input section of said user interface generates a change signal upon activation by a user, said change signal instructing that at least one of the target temperature, target air volume, start time or an end time be changed, said change signal being outputted from said input section to a change management section of said controller, whereupon said controller changes the target temperature target air volume, start time or an end time according to the change signal while continuing to thereafter run the remaining control management data profile.

19. The controller of claim 18, wherein said change management section of said controller outputs a change profile command to said data storage section to define a new control management data profile including the changed target temperature, target air volume, start time or end time.

20. The controller of claim 1, wherein said user interface further comprises an image generation section and a display, said image generation section creating image data to update the control management data and providing an output on said display to depict the control management data profile being executed and any change input data entered by a user.

21. The controller of claim 20, wherein said display of said user interface comprises a light emitting diode display, a liquid crystal display or an organic electroluminescent display.

22. The controller of claim 20, wherein said display of said user interface displays the target temperature and the actual measured temperature of the hot air.

23. A controller for controlling the temperature and airflow of a hot air blower having a heating member and an air feed, said controller comprising:
   a heating control section to execute control management data instructions which define heating control management data profiles;
   a data storage section to store control management data profiles, each profile having a plurality of stages; and
   a user interface including a first input section and a second input section which receive input operations to change the thermal energy delivered to the heating member of the hot air blower during the execution of a heating control management data profile by changing at least one of the target temperature and the target air volume, of at least one stage of the control management data profile being executed.

24. The controller of claim 23, wherein said data storage section stores a plurality of control management data profiles, each profile having at least four stages, and for each stage the profile includes a target temperature, target air volume, a start time and an end time, said controller controlling the heating provided by the hot air blower from the first stage to the last stage in order and irreversibly and wherein said first input section of said user interface generates a change signal upon activation by a user, said change signal instructing that at least one of the target temperature and the target air volume be changed during at least one stage, said change signal being outputted from said first input section to a change management section of said controller, whereupon said controller changes the target temperature or target air volume according to the change signal while continuing to thereafter run the remaining control management data profile.

25. The controller of claim 24, wherein said change management section of said controller outputs a change profile command to said data storage section to define a new control management data profile including the changed target temperature, target air volume, start time or end time.

26. The controller of claim 25, wherein the controller allows a user to select from more than one change made to the stages of the control management data profile to create a new control management data profile.

* * * * *